United States Patent

Couto

[11] 4,028,756
[45] June 14, 1977

[54] HAND TOOL FOR WORKING ON ELECTRICAL CONDUCTORS

[75] Inventor: Luis R. Couto, Elizabeth, N.J.

[73] Assignee: Thomas & Betts Corporation, Elizabeth, N.J.

[22] Filed: Apr. 9, 1975

[21] Appl. No.: 566,192

[52] U.S. Cl. .................................. 7/5.5; 30/90.1; 72/410; 140/106
[51] Int. Cl.² ......................................... B25B 7/22
[58] Field of Search .................. 7/5.3, 5.2, 5.1, 5.4, 7/5.5, 5.6; 30/90.1; 81/9.5 R, 321, 332, 418, DIG. 5, 415, 416, 417, 428; 140/106; 29/203 H, 203 HM, 203 D

[56] References Cited

UNITED STATES PATENTS

| | | | |
|---|---|---|---|
| 1,388,398 | 8/1921 | Adams | 81/332 |
| 1,599,021 | 9/1926 | Long | 81/DIG. 5 |
| 2,079,505 | 5/1937 | Hopkins | 81/332 |
| 3,525,107 | 8/1970 | Hays | 7/5.3 |
| 3,654,647 | 4/1972 | Neff | 7/5.3 |
| 3,733,627 | 5/1973 | Epstein | 7/5.4 |
| 3,777,323 | 12/1973 | Ingram | 7/5.4 |
| 3,791,189 | 2/1974 | Lawson | 72/410 |
| 3,831,207 | 8/1974 | Boyajian | 7/5.6 |

Primary Examiner—Al Lawrence Smith
Assistant Examiner—Roscoe V. Parker
Attorney, Agent, or Firm—David Teschner; Jesse Woldman

[57] ABSTRACT

The disclosure is directed to a hand tool of the pliers configuration having a set of crimping nests located in jaw members and having the expansion zones of the crimping nests overlap so as to permit placement of each of the nests closer to the optimum distance from the handle pivot. A visual indicator permits the operator to crimp terminals of different discrete sizes in a single one of the crimping nests and a hook member used to lock the handles in a closed position further provides discrete limits of crimping nest closure. A compression spring located in overlapping slots of the handle member provides a recessed means to rapidly open the handles when the hook member is released. Discretely sized insulation cutting edges located between the pivot and the handle free ends permits the edges to overlap one another and thus provide an almost complete cut about the wire periphery and provide a wedge to break through the uncut land of insulation.

12 Claims, 16 Drawing Figures

HAND TOOL FOR WORKING ON ELECTRICAL CONDUCTORS

COPENDING APPLICATIONS

DIE SET by Luis R. Couto, Ser. No. 618,150 filed Sept. 30, 1975 and assigned to the assignee of the instant invention.

BACKGROUND OF THE INVENTION

1. Field of the Invention

The invention is directed to the field of tools for working upon electrical conductors to cut, strip the insulation therefrom and affix terminals thereto, as well as cut terminal screws and similarly threaded rods.

2. Description of the Prior Art

Multi-function tools were well known in the prior art, as for example, U.S. Design Pat. No. 188,392 issued July 12, 1960 to David J. Crimmins for *Crimping Tool*, assigned to the assignee of the instant invention now expired. They generally suffered from the fact that the location of most elements on the tool was as a result of compromises which attempted to provide all required functions whether or not each element worked at its optimum capacity. On the Crimmins tool, as will be explained below in greater detail, there were provided three crimping nests, two for insulated terminals of different size ranges and one for bare terminals. This arrangement had a great drawback increased in scope by the number of crimping nests employed. In a pliers-type tool for a desired handle pressure, or force, only one point along the jaws or handles provides the correct crimping force. Moved off of that point, the crimping force is increased or decreased depending upon the direction of movement of the crimping nest. Thus, for two nests, each could be adjacent the optimum point but as the number of nests goes up the displacement is greater and the error from the desired crimping force is increased. The number of nests is increased so that the terminals are properly applied, not crushed or left partially uncrimped. The nest dimension must be such that at closed handle position the various ranges of terminals are properly crimped. The use of operator discretion to determine when the crimp was complete and thus permit the use of one nest, is not satisfactory since operator strength and operator "feel" is not repeatable.

SUMMARY OF THE INVENTION

The invention provides a tool which overcomes many of the difficulties noted above with respect to prior devices and provides a solution to these difficulties which is simple and does not increase the complexity of such tools. The tool makes use of a single crimping nest for insulated terminals and a single crimping nest for bare terminals, each nest able to accommodate a range of terminal sizes and provides a visual indicator by which the operator can simply determine when sufficient crimping forces have been applied to a given terminal by size thereby eliminating the necessity for a multiplicty of crimping nests. By overlapping the terminal expansion zones adjacent the one bare terminal crimping nest and the one insulated terminal crimping nest, the nests can be placed closer to the optimum point than was possible heretofore. A compression spring, located in overlapping slots in the tool handles, provides a low profile means for instantly opening the handles once the multi-function handle lock is released. The handle lock hooks about a hook end of one handle to hold the handles and jaws in a safe closed position. The lock is then released and can be positioned in one of three locations to limit the closure of the handles and thus the crimping nests as a back stop, in a gross manner, for the visual indicator. The wire stripper section has apertures of discrete size formed when the handle sections overlap. The apertures form complete circles about the conductor and cut to within a short distance of the bare conductor leave a thin land of insulation between the bare conductor and blade edge, thus preventing nicking of the bare conductor. The bolt cutter action is provided by a series of threaded apertures of discrete bolt sizes into which the bolt is threaded with the portion to be cut extending below the threaded aperture into an aligned, slightly oversized aperture in the opposite handle when the handles are in the full open position. When the handles are operated, the bolt is sheared by the moving edge of the unthreaded aperture and the threads chased by unthreading the cut bolt from the threaded aperture. It is therefore an object of this invention to provide an improved hand tool.

It is another object of this invention to provide an improved multi-function hand tool.

It is yet another object of this invention to provide a hand tool having crimping dies, a visual indicator to indicate to the operator the proper range of handle forces required to install terminals of different sizes.

It is another object of this invention to provide a die set having two or more crimping nests with portions thereof overlapped to decrease the overall size of the members.

It is yet another object of this invention to provide a hand tool having two or more crimping nests with portions thereof overlapped to decrease the overall size of crimping nest area and permit placement of each crimping nest adjacent the optimum crimping nest location.

It is still another object of this invention to provide a hand tool with a multi-function lock member which can be used to hold the tool in a closed state and which can be used to set limits for tool closure when the tool is used for cutting or crimping.

It is still another object of this invention to provide an improved tool with a spring operated opening mechanism, employing a compression spring extending between the two handle members and set in overlapping slots to provide a spring member recessed below the handle surfaces.

It is yet another object of this invention to provide a hand tool with insulation removal blades which cuts through most of the insulation but leaves a thin land of insulation about the bare conductor to prevent nicking the bare conductor and provides a wedge to permit the insulation to be completely severed without injury to the bare conductor.

Other objects and features of the invention will be pointed out in the following description and claims and illustrated in the accompanying drawings, which disclose, by way of example, the principles of the invention, and the best mode has been contemplated for carrying it out.

BRIEF DESCRIPTION OF THE DRAWING

In the drawings in which similar elements are given similar reference characters.

DESCRIPTION OF THE PREFERRED EMBODIMENT

Figure 1:
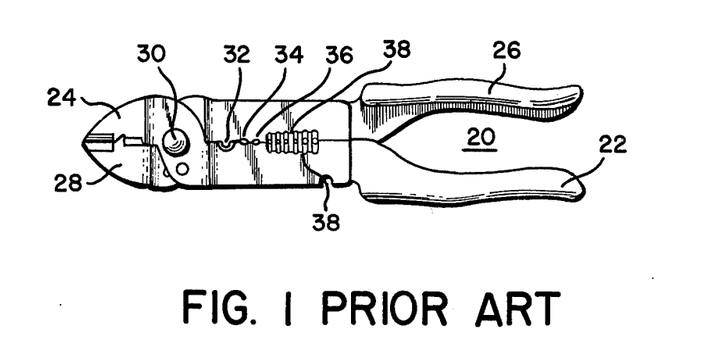
FIG. 1 is a top plan view of a hand tool according to the prior art and is FIG. 1 of the above cited Crimmins patent.

Turning now to FIG. 1 there is shown a multi-function hand tool 20 constructed in accordance with the prior art teachings. Tool 20 is of the pliers-type having a handle 22 terminating in a first jaw 24 and a handle 26 terminating in a second jaw 28 pivotally assembled by a pivot pin 30. Located between pivot pin 30 and the free ends of the handles 22, 26 are a bare terminal crimping nest 32, a first size insulated terminal crimping nest 34 and a second size insulated terminal crimping nest 36. For a pliers-type tool of the type shown and with the crimping nests between the pivot 30 and the free ends of the handles 22, 26, the mechanical advantage is that found in Class II levers and as such there is one point along the handles 22, 26 at which the crimping force available would be that required to properly crimp a terminal to a conductor for a given pressure that the operator is required to expend. Beyond that point, the force is lower or higher, depending upon the direction of movement.

Figure 2:
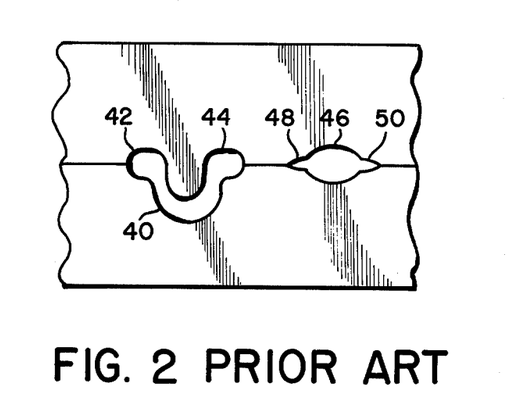
FIG. 2 is a fragmentary top plan view of the crimping nest area of a typical prior art tool.

Two nests for crimping different sized terminals are required to prevent crushing the terminal or failing to properly crimp it to the conductor. Based on the mechanical stops for the tool 20 one size of terminal can be crimped by each nest and the material displaced from the crimping nests was permitted to enter the opening between the handles 22, 26 which were not permitted to meet during the crimping operation. If the handles were intended to meet then expansion zones to either side of the crimping nest was required, as shown in FIG. 2 wherein bare terminal crimping nest 40 has an expansion zone 42 to its left and an expansion zone 44 to its right. Similarly, insulated terminal crimping nest 46 has expansion zone 48 to its left and 50 to its right. These expansion zones accept insulation and terminal material laterally extruded out of the crimping nest as the handles meet and the crimping nests close. As a result of this requirement for expansion zones the crimping nest 40, 46 are more widely spaced than the crimping nests 32, 34 and 36 of FIG. 1.

The fact that the handles meet as shown by handles 22, 26 in FIG. 1 means that the stripping edges 38 are only permitted to meet and will not fully cut into the insulation about the bare conductor, but will probably not cut into the insulation at all where the edges 38 meet.

Figure 3:
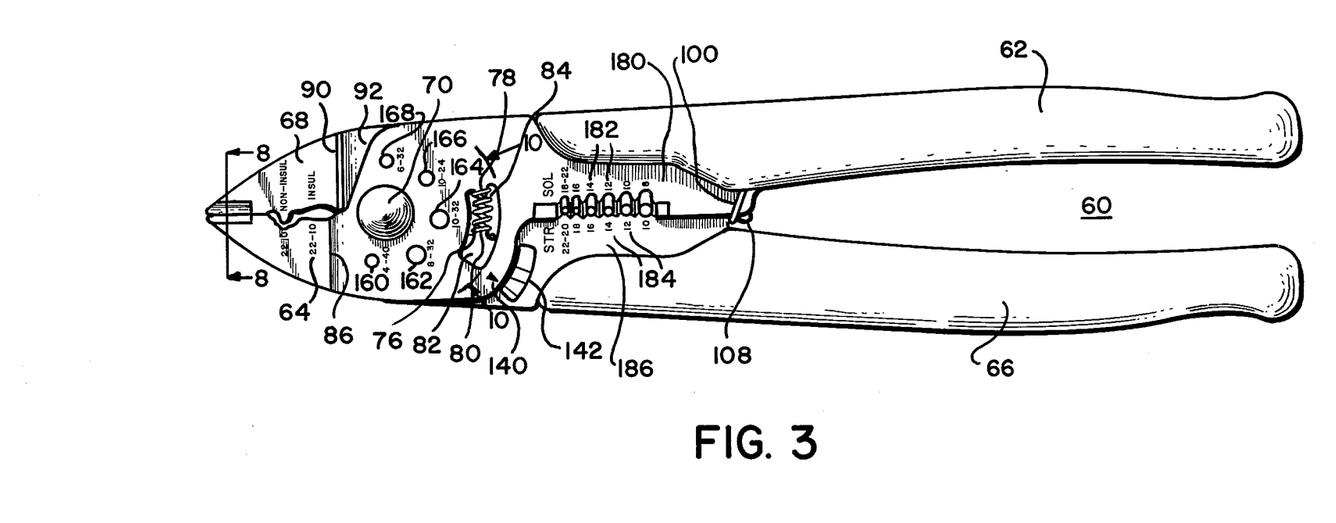
FIG. 3 is a top plan view of a tool constructed in accordance with the concepts of the invention.
Figure 4:
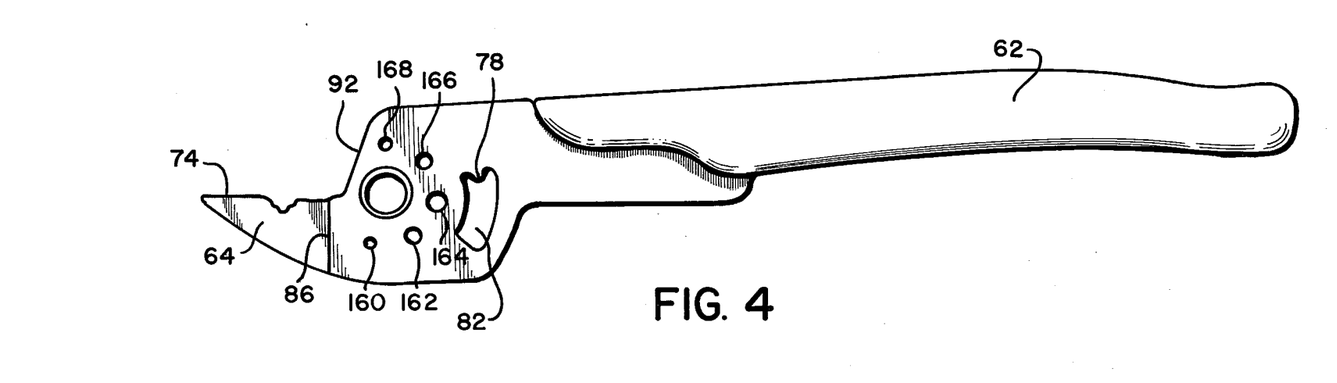
FIG. 4 is a top plan view of one of the handle jaw members of the tool of FIG. 3.
Figure 5:
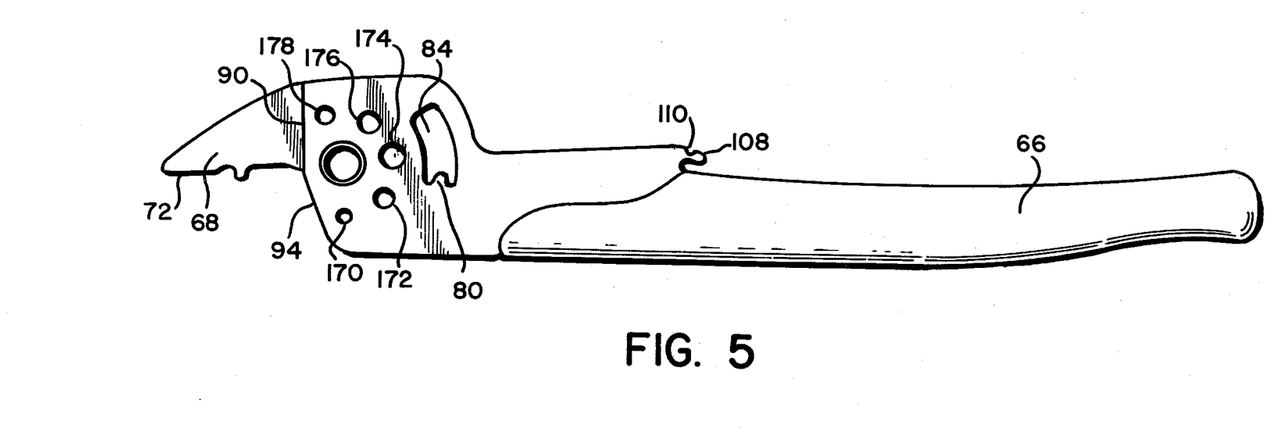
FIG. 5 is a top plan view of the other of the handle-jaw members of the tool of FIG. 3.
Figure 8:
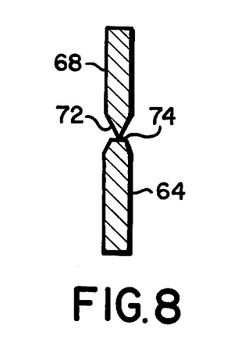
FIG. 8 is a rear elevational view along the lines 8—8 of FIG. 3.

Turning now to FIGS. 3, 4 and 5, there is shown a multi-function hand tool 60 constructed in accordance with the concepts of the invention. Tool 60 has a first handle 62 terminating in a first jaw member 64 and a second handle 66 terminating in a second jaw member 68, the handles 62 and 66 being coupled by pivot pin 70 to permit the handles 62 and 66 to be moved toward and away from each other to cause the jaw members 64 and 68 to be similarly moved towards and away from each other. Formed adjacent the free end of jaw member 68, on an interior surface, is a blade 72 which cooperates with an anvil 74 formed on the cooperating interior surface adjacent the free end of jaw member 64, as is best seen in FIG. 8. A conductor can be cut by placing same on the anvil 74 and then bringing the blade 72 into contact therewith by operating handles 62 and 66 towards each other, thus bringing blade 72 first into contact with a conductor (not shown) and then the anvil 74 which also provides support for the conductor.

Figure 10:
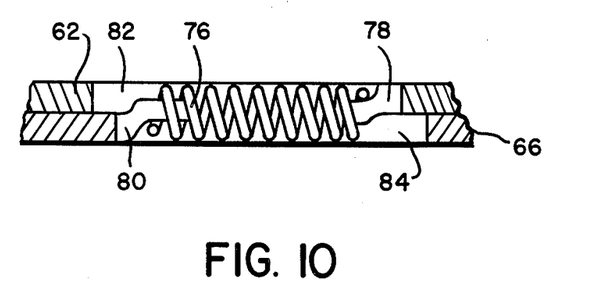
FIG. 10 is a fragmentary, rear elevational view along the lines 10—10 of FIG. 3.

The handles 62, 66, when not latched, as will be explained below, are urged into a spaced apart position, thus separating blade 72 from anvil 74 by means of compression spring 76. Compression spring 76 extends from a first hub 78 on handle 62 to a second hub 80 on handle 66 and within overlapping slots 82 in handle 62 and 84 in handle 66. As can be best seen in FIG. 10, the spring 76 extends from hub 78 formed on handle 62 and extending into slot 82 in the handle 62. The other end of spring 76 is anchored on hub 80 formed in handle 66 and extending into slot 84 in the handle 66. The slots 82 and 84 overlie one another, as shown in FIG. 10, overlying one another the most when handles 62, 64 are furthest from one another and overlie one another and portions of the handles adjacent the slots, when the handles 62, 64 are closest to one another, as shown in FIG. 3. In FIG. 3, a portion of the handle 66 is visible through slot 82 in the handle 62. With this slot arrangement the compression spring 76 is kept wholly within the tool 60 and does not interfere with any of the tool's functions as might occur with other spring arrangements. The compression spring 76 operates to separate the handles 62 and 66 and thus makes all operative parts of the tool 60 available immediately.

Figure 6:
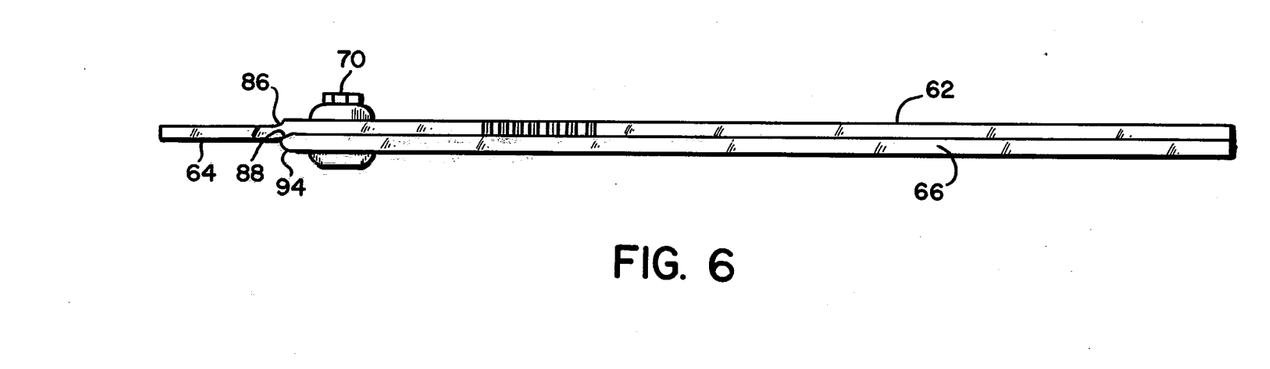
FIG. 6 is a side elevational of the tool of FIG. 3.

The handle 62, as it becomes jaw member 64, goes through two bends as at 86, 88 (see FIG. 6) so that the plane of jaw members 64 and 68 can be made common despite the fact that handle 62 overlies handle 66. Although not visible in the figure the handle 66 goes through two bends, one of which 90 is indicated in FIG. 3, to position jaw member 68 on the same plane as jaw member 64. Further, at the full open position of the handles 62, 64, shoulder 92 of handle 62 engages the bent up portion of handle 66 and shoulder 94 of handle 66 engages the bent down area between bends 86, 88 on handle 62 acting as stops to prevent the tool from opening any further under the influence of compression spring 76.

Figure 11:
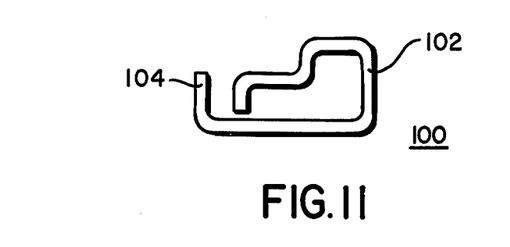
FIG. 11 is a top plan view of the locking mechanism of FIG. 3.
Figure 12:
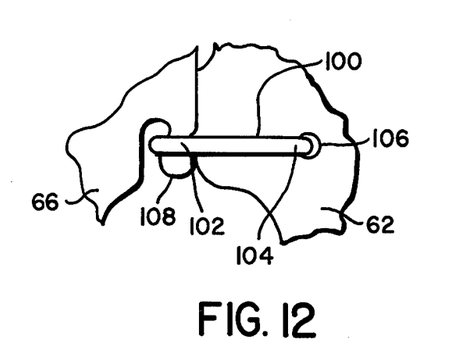
FIGS. 12, 13, 14 and 15 are fragmentary top plan views, greatly enlarged, showing the various positions of the locking mechanism of FIG. 11 with respect to the tool handles.

In that the handles 62, 66 are urged away from each other, it is necessary to have a latch mechanism to hold the handles 62, 66 together when the tool 60 is not in use, as when it is being carried in an electrician's pouch. Keeping the handles 62, 66 closed also means all cutting mechanisms are closed and, if the tool 60 is handled no one will be injured. The latch mechanism 100, as is shown in FIGS. 11 and 12, is made up of a spring wire form having a hook end 102 and a turned-in end 104 for insertion within an aperture 106 in handle 62. The aperture 106 extends through the metal of handle 62 and the overlying grip holds end 104 of the latch mechanism 100 in place while permitting it to pivot about end 104 inserted in aperture 106. The hook end 102 cooperates with a hook portion 108 of the handle 66. When the latching mechanism 100 is positioned, as in FIG. 12, the tool 60 handles 62, 66 are latched in a slightly overlapped position.

To release the latching mechanism 100 it is necessary to squeeze the handles 62, 66 slightly together and swing the latch mechanism 100 counterclockwise out of engagement with hook portion 108 of handle 66. Once the latch mechanism 100 is clear of hook portion 108 the handles 62, 66 are free to open under the influence of compression spring 76.

Figure 13:
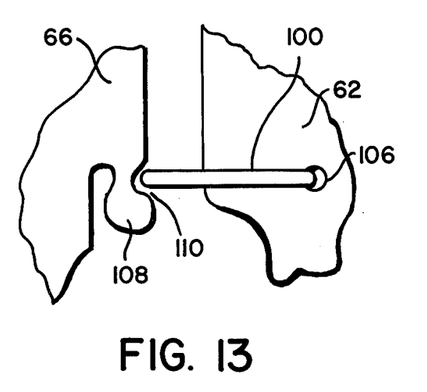
Figure 14:
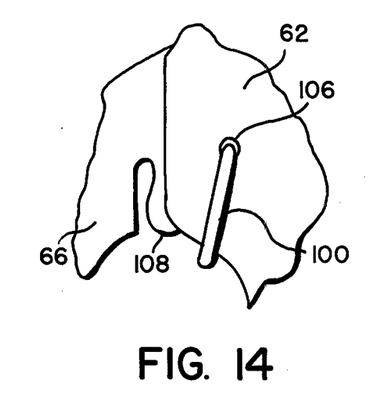
Figure 15:
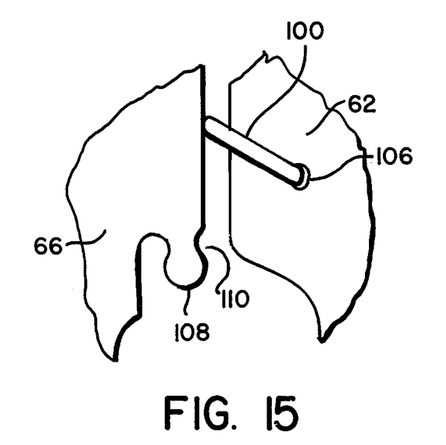

The latch mechanism 100 can also be used as a stop mechanism to limit the closure of jaw members 64, 68 depending upon its position as shown in FIGS. 13, 14 and 15. When the latch mechanism 100 is placed against the handle 62, as shown in FIG. 14, maximum handle closure is permitted, limited only by the action of shoulders 92 and 94 against the handle bend portions as set out above. This is the position the latch mechanism 100 is normally placed in during use. A first handle closure limit is achieved by placing the latch mechanism 100 in the position shown in FIG. 15 whereby it engages the interior surface of handle 66 above the hook portion 108 and serves to prevent full closure of the handles 62, 66. The latch mechanism 100 may also be placed horizontal, as is shown in FIG. 13, to engage recess 110 in hook portion 108. This position limits to a greater extent the closure of handles 62 and 66. Any other convenient arrangement may be employed to limit handle closure as is needed.

Figure 7:
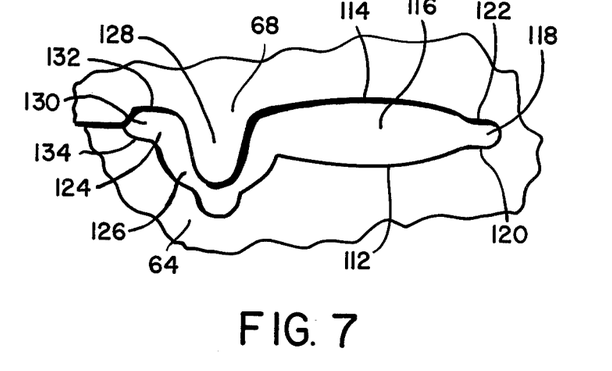
FIG. 7 is a fragmentary top elevational view, greatly enlarged, of the crimping nest area of the tool of FIG. 3.

Turning now to FIG. 7, the details of the crimping portion of the tool 60 are set forth. A cavity 112 in jaw member 64 cooperates with a cavity 114 in jaw member 68 to form a crimping nest 116 for crimping insulated terminals to the bared ends of electrical conductors. In that the jaw members 64, 68 are intended to close, some provision must be made to accommodate the material that extrudes laterally away from the crimp nest 116. Space to receive the material, whether insulation, terminal material, conductor or any combination thereof is provided on the right side of crimping nest 116 by the expansion zone 118 made up of recess 120 in jaw member 64 and recess 122 in jaw member 68. The expansion zone to the left of crimping nest 116 will be described below.

Adjacent crimping nest 116 is crimping nest 124 for bare terminals and composed of a recess 126 in jaw member 64 and an indentor 128 on jaw member 68. To provide for the expansion of material out of crimping nest 124 as indentor 128 compresses a terminal placed in recess 126 an expansion zone 130 made up of a recess 132 in jaw member 68 and 134 in jaw member 64 is provided.

The right expansion zone for crimping nest 124 is made to be the crimping nest 116 itself. The reason for this is as follows: Only one nest 116 or 124 can be used at a time leaving the unused nest empty and able to accommodate any material extruded from the used nest. Thus, the entire crimping nest 116 provides the right side expansion zone for crimping nest 124. Similarly, the crimping nest 124 provides the left expansion zone for crimping nest 116. With the use of the unused crimping nest as an expansion zone for the crimping nest in use, the space required for these two crimping nest expansion zones can be omitted and the crimping nests themselves can be placed closer to the optimum spacing prescribed.

Figure 9:
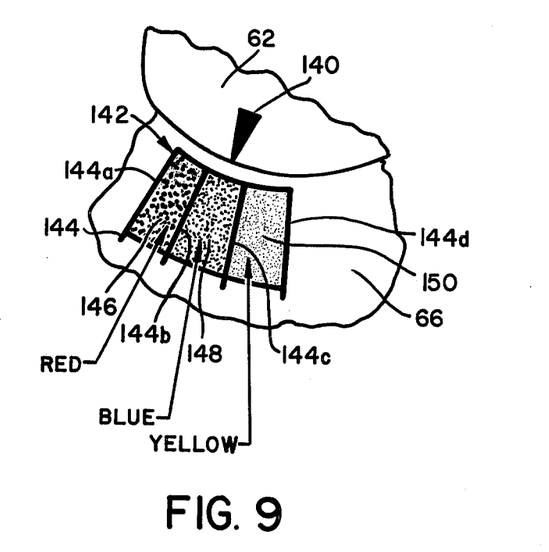
FIG. 9 is a fragmentary, top plan view, greatly enlarged, of the indicating portion of the tool of FIG. 3.

The tool 60 has but a single crimping nest 116 for insulated terminals and thus it is necessary to be able to limit the closure of the jaw member 62, 66 to properly install a range of terminal sizes with the same nest. This can be done partially by using the various positions of the latching mechanism 100, as shown in FIGS. 12 to 15. It can also be accomplished by a visual indicator as is shown in FIGS. 3 and 9. An index 140 is positioned on handle 62 and is arranged to sweep past a range indicator 142 on handle 66. The range indicator 142 has a series of heavy marks 144 to indicate the range in which the index 140 must stop in order that a terminal in the crimping nests 116, 124 be properly crimped. The ranges may be color coded between the marks 144 to indicate the range for a particular terminal wire barrel size. Thus, the region 146 between marks 144a and 144b may be colored red to correspond with the usual color coding of terminals intended to be used with wire sizes 18 to 22, the region 148 between marks 144b and 144c blue to correspond to the 14 to 16 guage wire sizes and the region 150 between marks 144c and 144d colored yellow to correspond to the wire guages 10 to 12.

To use the visual indicator provisions, the user determines the wire size to which he must connect a terminal. He then picks the correct terminal and places it in the appropriate crimping nest 116 for insulated terminals and 124 for bare terminals. Assume the wire size is 10 guage and a yellow terminal is selected. The terminal is insulated and is thus inserted into crimping nest 116 and the handles 62, 66 are operated towards one another until the terminal is gripped with the wire inserted into the wire receiving barrel of the terminal. Now the handles 62, 66 are operated towards one another until index 140 is opposite the region 150 between the mark 144d and the mark 144c. At any point between the marks 144c and 144d, the terminal has been correctly crimped upon the conductor and any further crimping would badly distort or destroy the terminal. As many regions as desired may be placed on the tool 60 to permit it to accommodate the range of terminals desired. The shape of recesses 112 and 114 is made general rather than to conform to a particular terminal outline so that a range of terminal sizes can be accommodated.

To cut bolts and terminal screws the bolt or terminal screw is threaded into the threaded apertures 160, 162, 164, 166 or 168 in the handle 62 (See FIGS. 3 and 4) and run into the complementary apertures 170, 172, 174, 176 and 178 in handle 66. The apertures 170, 172, 174, 176 and 178 are unthreaded and slightly larger than the apertures 160, 162, 164, 166 and 168 and thus offer no resistance to the passage of a bolt therethrough. When the desired length extends from the bottom surface of handle 62 upwards, the handles 62, 66 are operated towards one another and the edge of the aperture in the handle 66 through which the bolt extends is thereby cut and the unthreading of the bolt from the thread aperture in handle 62 serves to chase the threads of the cut bolt.

Figure 16:
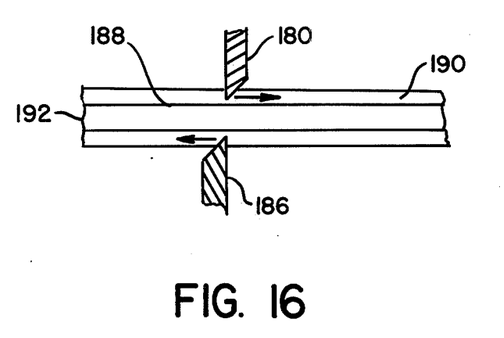
FIG. 16 is a diagrammatic representation of the wire stripping operation of the tool of FIG. 3.

The tool 60 also provides a wire stripper portion. As shown in FIG. 3, the portion 180 of the handle 62 has a series of discrete arcuate blade portions in increasing diameter from the pivot 70 towards the free end of the handle 62. Each of the arcuate blade portions is dimensioned to be of a slightly greater diameter than the guage of the conductor indicated next to it by the indicia 182 for solid conductors or by indicia 184 for stranded conductors. Cooperating with each of the arcuate blade portions on portion 180 of handle 62 are a series of arcuate blade portions on the portion 186 of handle 66. Each of the cooperating arcuate blade portions slightly overlap one another so as to form a completely circular pattern about any conductor but not completely cutting through the conductor insulation, as shown in FIG. 16. The blade portions leave a small land 188 of uncut insulation 190 about the bare metal 192 of the conductor. This prevents actual contact between the blades and the metal 192 of the conductor which could be destructive of the metal portion 192 of the conductor. The blade portions 180, 186 then act as wedges to permit the partially severed insulation to be pulled off.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. A hand tool comprising: a first handle member; a second handle member; pivot means coupling said second handle member to said first handle member to permit selective movement of said first and second handles towards and away from each other in arcs about said pivot means; first jaw means coupled to said first handle means; first crimping means on said first jaw means; indicator means on said first jaw means; second jaw means coupled to said second handle means; second crimping means on said second jaws means and indicia on said second jaw means arranged to be positioned adjacent said indicator means in said first jaw means; said indicia indicating the proper positions for said first and second jaw members to crimp a selected terminal to an appropiately sized conductor placed in said first and second crimping means; the positioning of said indicator means adjacent said indicia permitting a visual determination of a proper crimp of a selected terminal to an appropriately sixed conductor.

2. A hand tool comprising: a first handle member; a second handle member; pivot means coupling said second handle member to said first handle member to permit selective movement of said first and second handles towards and away from each other in arcs about said pivot means; first jaw means coupled to said first handle means; first crimping means on said first jaw means; indicator means on said first jaw means; second jaw means coupled to said second handle means; second crimping means on said second jaw means and indicia on said second jaw means arranged to be positioned adjacent said indicator means in said first jaw means; said indicia comprising a plurality of marked pairs indicating the initial and final positions of a crimping range which will permit said first and second jaw means to crimp a selected terminal to an appropriately sized conductor placed in said first and second crimping means; the positioning of said indicator means adjacent an appropriate crimping range delimited by a marked pair of indicia permitting a visual determination of a proper crimp of a selected terminal to an appropriately sized conductor.

3. A hand tool comprising: a first handle member; a second handle member; pivot means coupling said second handle member to said first handle member to permit selective movement of said first and second handles towards and away from each other in arcs about said pivot means; first jaw means coupled to said first handle means; first crimping means on said first jaw means; indicator means on said first jaw means; second jaw means coupled to said second handle means; second crimping means on said second jaw means and indicia on said second jaw means arranged to be positioned adjacent said indicator means in said first jaw means; said indicia comprising a plurality of colored segments, each segment indicating the initial and final positions of a crimping range which will permit said first and said second jaw means to crimp a selected, color coded terminal to an appropriately sized conductor placed in said first and second crimping means; the positioning of said indicator means adjacent a like colored segment permitting a visual determination of a proper crimp of the selected, color coded terminal to an appropriately sized conductor.

4. A hand tool comprising: a first handle member; a second handle member; pivot means coupling said second handle member to said first handle member to permit selective movement of said first and second handles towards and away from each other in arcs about said pivot means; first jaw means coupled to said first handle means; first crimping means on said first jaw means; indicator means on said first jaw means; second jaw means coupled to said second handle means; second crimping means on said second jaw means and indicia on said second jaw means arranged to be positioned adjacent said indicator means in said first jaw means; said indicia comprising a plurality of colored segments, each segment bounded by a marked pair of indicating the initial and final positions of a crimping range which will permit said first and second jaw means to crimp a selected, color coded terminal to an appropriately sized conductor placed in said first and second crimping means; the positioning of said indicator means adjacent a like colored segment permitting a visual determination of a proper crimp of the selected, color coded terminal to an appropriately sized conductor.

5. A hand tool as defined in claim 1, wherein said first and said second crimping means are die nests to accept an insulated terminal therein and permit said insulated terminal to be crimped onto a conductor inserted in said terminal.

6. A hand tool as defined in claim 1, wherein said first crimping means is an indentor and said second crimping means is a die nest to accept an uninsulated terminal therein and permit said uninsulated terminal to be crimped onto a conductor inserted in said terminal.

7. A hand tool comprising: a first handle member; a second handle member; pivot means coupling said second handle member to said first handle member to permit selective movement of said first and second handles towards and away from each other in arcs about said pivot means; first jaw means coupled to said first handle means; first crimping means on said first jaw means; indicator means on said first jaw means; second jaw means coupled to said second handle means; second crimping means on said second jaw means; indicia on said second jaw means arranged to be positioned adjacent said indicator means in said first jaw means; said indicia indicating the proper positions for said first and second jaw members to crimp a selected terminal to an appropriately sized conductor placed in said first and second crimping means; the positioning of said indicator means adjacent said indicia permitting a visual determination of a proper crimp of a selected terminal to an appropriately sized conductor receiver means on said second handle means and a selectively positioned lock and stop means on said first handle means; said lock and stop means when positioned to engage said receiver means on said second handle means locking said first and second handle members together to prevent relative movement of said first and second handle members with respect to one another; said lock and stop means when positioned in further selected positions bearing against said second handle member to limit the closure of said first and second handle members and thus limiting the crimping of a terminal placed between said first and second crimping means.

8. A hand tool as defined in claim 1, further comprising: a first recess in said first handle member; a first hub on said first handle member, said first hub projecting into said first recess; a second recess in said second handle member; a second hub on said second handle member, said second hub projecting into said second recess and a compression spring extending from said first hub to said second hub completely within said first and second recesses, said compression spring tending to keep said first and second handle members apart.

9. A hand tool as defined in claim 1, having a cutting edge at the free end of said first jaw means and an anvil at the free end of said second jaw means to sever conductors inserted between said anvil and cutting edge as said first and second handle members are operated towards one another.

10. A hand tool comprising: a first handle member; a second handle member; pivot means coupling said second handle member to said first handle member to permit selective movement of said first and second handles towards and away from each other in arcs about said pivot means; first jaw means coupled to said first handle means; first crimping means on said first jaw means; second jaw means coupled to said second handle means; second crimping means on said second jaw means; receiver means on said second handle means; and a selectively positioned lock and stop means on said first handle means; said lock and stop means when positioned to engage said receiver means on said second handle member locking said first and second handle members together to prevent relative movement of said first and second handle members with respect to one another; said lock and stop means when positioned in further selected positions bearing against said second handle member to limit the closure of said first and second handle members and thus limit the crimping of a terminal placed between said first and second crimping means.

11. A hand tool as defined in claim 10, wherein said first and second crimping means are die nests to accept an insulated terminal therein and permit said insulated terminal to be crimped onto a conductor inserted in said terminal.

12. A hand tool as defined in claim 10, wherein said first crimping means is an indentor and said second crimping means is a die nest to accept an uninsulated terminal therein and permit said uninsulated terminal to be crimped onto a conductor inserted in said terminal.

* * * * *

UNITED STATES PATENT AND TRADEMARK OFFICE
CERTIFICATE OF CORRECTION

PATENT NO. : 4,028,756
DATED : June 14, 1977
INVENTOR(S) : Luis R. Couto

It is certified that error appears in the above-identified patent and that said Letters Patent are hereby corrected as shown below:

Column 2, line 9, "leave" should be -- leaving --.

Column 3, line 12, "elevational" should be -- elevation --.

Column 8, line 52, delete "of".

Column 9, line 32, "limiting" should be -- limit --.

Signed and Sealed this

Eleventh Day of October 1977

[SEAL]

Attest:

RUTH C. MASON
Attesting Officer

LUTRELLE F. PARKER
Acting Commissioner of Patents and Trademarks